US012773943B2

(12) United States Patent
Murase et al.

(10) Patent No.: US 12,773,943 B2
(45) Date of Patent: Oct. 27, 2026

(54) VEHICLE HEADLIGHT CONTROL APPARATUS, VEHICLE HEADLIGHT CONTROL METHOD, AND VEHICLE HEADLIGHT CONTROL PROGRAM

(71) Applicants: TOYOTA JIDOSHA KABUSHIKI KAISHA, Toyota (JP); DENSO CORPORATION, Kariya-city (JP)

(72) Inventors: Yukimi Murase, Okazaki (JP); Takuya Nomura, Chita-gun (JP); Tetsuya Ikuta, Miyoshi (JP)

(73) Assignees: TOYOTA JIDOSHA KABUSHIKI KAISHA, Toyota (JP); DENSO CORPORATION, Kariya-City (JP)

( * ) Notice: Subject to any disclaimer, the term of this patent is extended or adjusted under 35 U.S.C. 154(b) by 84 days.

(21) Appl. No.: 18/916,107

(22) Filed: Oct. 15, 2024

(65) Prior Publication Data

US 2025/0145080 A1 May 8, 2025

(30) Foreign Application Priority Data

Nov. 7, 2023 (JP) ................................. 2023-189845

(51) Int. Cl.
*B60Q 1/14* (2006.01)

(52) U.S. Cl.
CPC .......... *B60Q 1/143* (2013.01); *B60Q 2300/42* (2013.01); *B60Q 2300/45* (2013.01)

(58) Field of Classification Search
CPC ............... B60Q 1/143; B60Q 2300/42; B60Q 2300/45; B60Q 2300/054; B60Q 2300/314
See application file for complete search history.

(56) References Cited

U.S. PATENT DOCUMENTS 7,888,876 B2 * 2/2011 Kitagawa ............... H05B 47/17 315/80
9,538,601 B1 * 1/2017 Mangtani ........... H05B 45/3725
10,759,329 B2 9/2020 Morimura et al.
10,946,791 B2 3/2021 Morimura et al.
11,260,789 B2 3/2022 Morimura et al.
11,605,152 B1 * 3/2023 Chase ................ G02B 27/0101
(Continued)

FOREIGN PATENT DOCUMENTS

JP 7238829 B2 3/2023

*Primary Examiner* — Seung C Sohn
(74) *Attorney, Agent, or Firm* — Sughrue Mion, PLLC

(57) ABSTRACT

A vehicle headlight control apparatus controls a headlamp capable of adjusting the amount of light for each of a plurality of light distribution areas. The vehicle headlight control apparatus includes: a high-luminance target detection unit that detects a high-luminance target ahead of a vehicle based on a camera image of a camera; a dimming control unit that performs dimming control to reduce the amount of light in the light distribution area including the high-luminance target based on a detection result of the high-luminance target detection unit; and a dimming control determination unit that determines whether the brightness of a surrounding environment is a threshold or higher based on the camera image. The dimming control unit does not perform the dimming control when the dimming control determination unit determines that the brightness of the surrounding environment is the threshold or higher.

9 Claims, 3 Drawing Sheets

(56) References Cited

U.S. PATENT DOCUMENTS

2003/0123705 A1* 7/2003 Stam .................... G06V 20/56
382/104
2013/0169155 A1* 7/2013 Nakashima ............. B60Q 1/14
315/82
2020/0150702 A1 5/2020 Ueda
2021/0253021 A1 8/2021 Murase et al.

* cited by examiner

VEHICLE HEADLIGHT CONTROL APPARATUS, VEHICLE HEADLIGHT CONTROL METHOD, AND VEHICLE HEADLIGHT CONTROL PROGRAM

CROSS-REFERENCE TO RELATED APPLICATION

This application claims priority to Japanese Patent Application No. 2023-189845 filed on Nov. 7, 2023 incorporated herein by reference in its entirety.

BACKGROUND

1. Technical Field

An aspect of the disclosure relates to a vehicle headlight control apparatus, a vehicle headlight control method, and a vehicle headlight control program.

2. Description of Related Art

An apparatus that performs dimming control to reduce the amount of light of a headlight of a vehicle in accordance with the luminance of high-luminance targets (such as a sign and a billboard), thereby reducing the glare of reflected light from the high-luminance targets caused by the headlight, is known (e.g., refer to Japanese Patent No. 7238829).

SUMMARY

When a vehicle travels in a bright environment (e.g., some expressways and urban areas) with many streetlights or buildings around it, an occupant of the vehicle tends to feel less glare from a high-luminance target than when the vehicle travels in a dark environment (e.g., mountain roads) with no streetlight around it. In this regard, in the apparatus described above, the dimming control may be performed despite a bright environment, and the occupant may feel annoyed by the dimming control.

Thus, it is an object of an aspect of the disclosure to provide a vehicle headlight control apparatus, a vehicle headlight control method, and a vehicle headlight control program that can reduce the annoyance felt by an occupant.

A vehicle headlight control apparatus according to an aspect of the disclosure is an apparatus that controls a headlight capable of adjusting the amount of light for each of a plurality of light distribution areas, the apparatus including: a high-luminance target detection unit that detects a high-luminance target ahead of a vehicle based on an imaging result of an imaging device that captures an image of an area ahead of the vehicle; a dimming control unit that performs dimming control to reduce the amount of light in the light distribution area including the high-luminance target based on a detection result of the high-luminance target detection unit; and a dimming control determination unit that determines whether the brightness of a surrounding environment is a threshold or higher based on the imaging result of the imaging device, in which the dimming control unit does not perform the dimming control when the dimming control determination unit determines that the brightness of the surrounding environment is the threshold or higher.

In the vehicle headlight control apparatus according the aspect of the disclosure, the dimming control determination unit may determine that the brightness of the surrounding environment is the threshold or higher when the brightness of a road surface around the vehicle is a threshold or higher, the brightness of the sky around the vehicle is a threshold or higher, or a plurality of streetlights is present around the vehicle and the distance between the plurality of streetlights is a certain distance or less.

A vehicle headlight control method according to an aspect of the disclosure is a method for controlling a headlight capable of adjusting the amount of light for each of a plurality of light distribution areas, the method including: a high-luminance target detection step of detecting a high-luminance target ahead of a vehicle based on an imaging result of an imaging device that captures an image of an area ahead of the vehicle; a dimming control step of performing dimming control to reduce the amount of light in the light distribution area including the high-luminance target based on a detection result in the high-luminance target detection step; and a dimming control determination step of determining whether the brightness of a surrounding environment is a threshold or higher based on the imaging result of the imaging device, in which the dimming control is not performed in the dimming control step when it is determined that the brightness of the surrounding environment is the threshold or higher in the dimming control determination step.

A vehicle headlight control program according to an aspect of the disclosure is a program for controlling a headlight capable of adjusting the amount of light for each of a plurality of light distribution areas, the program causing a computer to execute: a high-luminance target detection step of detecting a high-luminance target ahead of a vehicle based on an imaging result of an imaging device that captures an image of an area ahead of the vehicle; a dimming control step of performing dimming control to reduce the amount of light in the light distribution area including the high-luminance target based on a detection result in the high-luminance target detection step; and a dimming control determination step of determining whether the brightness of a surrounding environment is a threshold or higher based on the imaging result of the imaging device, in which the dimming control is not performed in the dimming control step when it is determined that the brightness of the surrounding environment is the threshold or higher in the dimming control determination step.

According to an aspect of the disclosure, it is possible to provide the vehicle headlight control apparatus, the vehicle headlight control method, and the vehicle headlight control program that can reduce the annoyance felt by an occupant.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Hereinbelow, an embodiment will be described in detail with reference to the accompanying drawings. In the description of the drawings, identical or equivalent elements are denoted by the same reference signs, and redundant description will be omitted.

Figure 1:
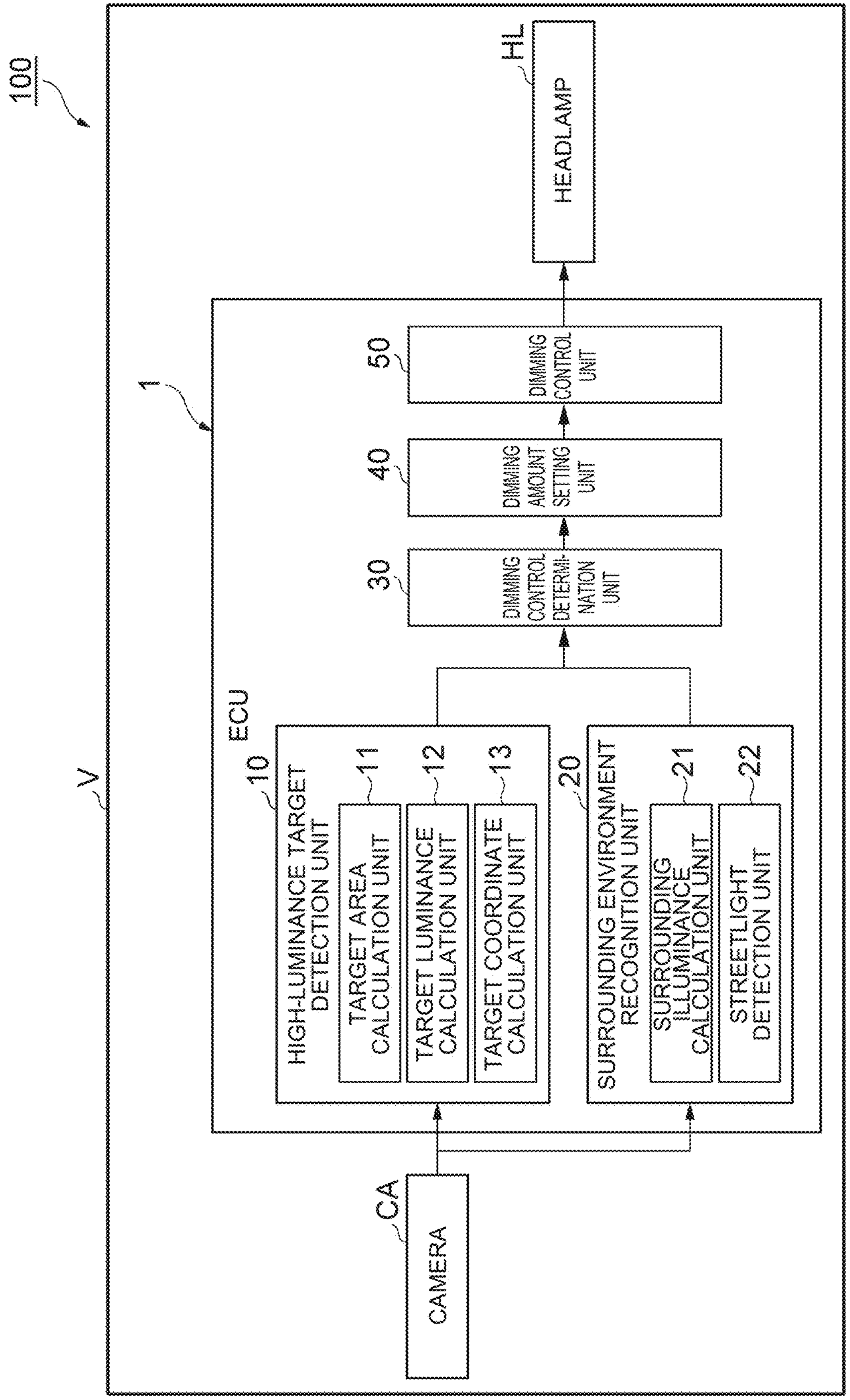
FIG. 1 is a block diagram showing the configuration of a vehicle headlight control apparatus according to an embodiment.

As shown in FIG. 1, a vehicle headlight control apparatus 100 according to the embodiment is an apparatus that controls a headlamp HL of a vehicle V. The vehicle V may be a passenger car or a freight car. The vehicle V is capable of carrying one or more occupants. The vehicle V may be an autonomous driving vehicle capable of performing autonomous driving. The vehicle V may be manually drivable by a driver. The vehicle headlight control apparatus 100 has a light distribution control function (e.g., an adaptive high-beam system (AHS)).

The headlamp HL is a lamp that illuminates an area ahead of the vehicle V. The headlamp HL is configured to be capable of adjusting the amount of light for each of a plurality of light distribution areas (irradiation areas). For example, the headlamp HL includes a plurality of LEDs arranged side by side, and can increase and reduce the amount of irradiation in any of the light distribution areas by adjusting the amount of energization of any of the LEDs. The vehicle headlight control apparatus 100 includes an electronic control unit (ECU) 1.

Figure 2:
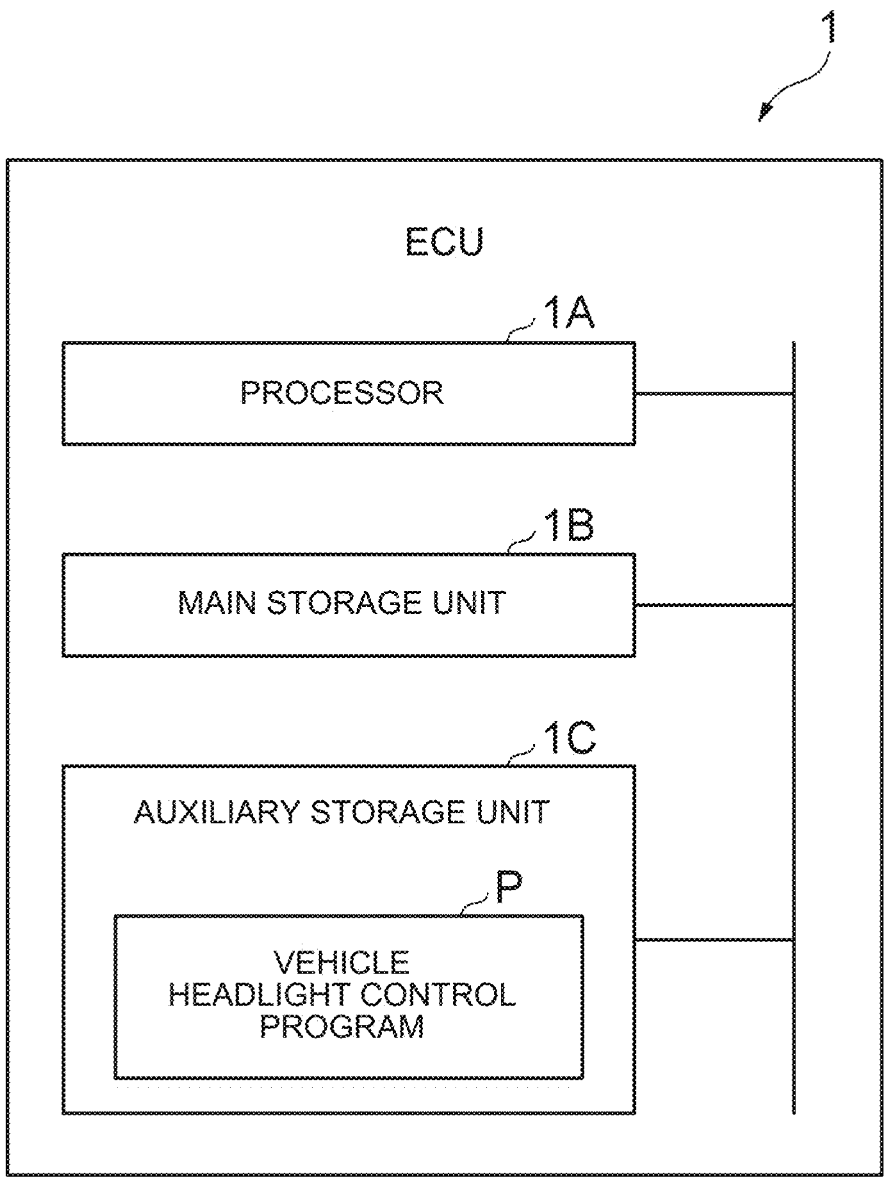
FIG. 2 is a diagram showing the hardware configuration of an ECU of FIG. 1.

As shown in FIG. 2, the ECU 1 is a computer including, as its hardware configuration, a processor 1A, a main storage unit 1B, and an auxiliary storage unit 1C. The processor 1A is an arithmetic unit that executes programs. An example of the processor is a central processing unit (CPU), but the type of the processor 1A is not limited thereto. The main storage unit 1B is a device that stores, for example, the programs, and calculation results output from the processor 1A. The main storage unit 1B is composed of, for example, at least one of a read only memory (ROM) and a random access memory (RAM). The auxiliary storage unit 1C is a device capable of storing a larger amount of data than the main storage unit 1B. The auxiliary storage unit 1C is composed of a nonvolatile storage medium, such as a hard disk or a flash memory. The auxiliary storage unit 1C stores a vehicle headlight control program P and various data. The vehicle headlight control program P is a program for controlling the headlamp HL and causes the ECU 1 (processor 1A) to execute a high-luminance target detection step, a dimming control step, and a dimming control determination step, which will be described further below.

As shown in FIG. 1, the ECU 1 includes, as its functional configuration, a high-luminance target detection unit 10, a surrounding environment recognition unit 20, a dimming control determination unit 30, a dimming amount setting unit 40, and a dimming control unit 50. The high-luminance target detection unit 10 detects a high-luminance target ahead of the vehicle V based on a camera image (imaging result) of a camera (imaging device) CA that captures an image of an area ahead of the vehicle V. The high-luminance target is a target having a luminance higher than a predetermined luminance and not limited to any particular target. The high-luminance target may be a self-luminous target that emits light by itself or a target that emits light by reflecting light of the headlamp HL or the like. Examples of the high-luminance target include a billboard, a signboard, and another vehicle with its lamp on.

The high-luminance target detection unit 10 includes a target area calculation unit 11 that calculates the area of a target present ahead of the vehicle V from the camera image, a target luminance calculation unit 12 that calculates the luminance of the target present ahead of the vehicle V from the camera image, and a target coordinate calculation unit 13 that calculates the coordinates of the target present ahead of the vehicle V from the camera image. Methods for calculating the area, the luminance, and the coordinates of the target are not limited to any particular methods, and various known methods may be used. The area of the target corresponds to, for example, the size of the target on the camera image (the projected area when viewed from the vehicle V). The coordinates of the target may be coordinates relative to any predetermined position and corresponds to, for example, the position of the target on the camera image. For example, the high-luminance target detection unit 10 detects a target having a luminance calculated by the target luminance calculation unit 12 higher than a predetermined luminance as the high-luminance target, and also detects the area and the coordinates of the high-luminance target using the target area calculation unit 11 and the target coordinate calculation unit 13, respectively.

The surrounding environment recognition unit 20 recognizes a surrounding environment that is the environment around the vehicle V. Specifically, the surrounding environment recognition unit 20 includes a surrounding illuminance calculation unit 21 that calculates the brightness (illuminance) of the road surface and the sky around the vehicle V from the camera image, and a streetlight detection unit 22 that detects the positions of a plurality of streetlights around the vehicle V from the camera image. The streetlights are not limited to any particular streetlights and may be various known streetlights. A method for calculating the brightness and a method for calculating the positions of the streetlights are not limited to any particular methods, and various known methods may be used.

The dimming control determination unit 30 determines whether the brightness of the surrounding environment of the vehicle V is a threshold or higher (the brightness suitable for performing dimming control) based on the camera image. Specifically, the dimming control determination unit 30 determines that the brightness of the surrounding environment of the vehicle V recognized by the surrounding environment recognition unit 20 from the camera image is the threshold or higher (not the brightness suitable for performing dimming control) when the surrounding environment is bright enough to make the occupant of the vehicle V unlikely to feel glare from the high-luminance target. The dimming control is the control to reduce the amount of light in at least any of the light distribution areas in the headlamp HL (hereinbelow, simply referred to as the "light distribution areas") including the high-luminance target.

More specifically, the dimming control determination unit 30 determines that the brightness of the surrounding environment is the threshold or higher when the brightness of a road surface around the vehicle V is a threshold or higher, the brightness of the sky around the vehicle V is a threshold or higher, or a plurality of streetlights is present around the vehicle V and the distance between the plurality of streetlights is a certain distance or less. The threshold may be previously determined and stored, or may be obtained by communication or the like. The threshold for the brightness of the road surface and the threshold for the brightness of the sky may be the same as each other or different from each other. The certain distance may be previously determined and stored, or may be obtained by communication or the like.

In addition, the dimming control determination unit 30 determines whether a start condition for the dimming control is satisfied based on the position (coordinates) and the size (area) of the high-luminance target detected by the high-luminance target detection unit 10. Specifically, the dimming control determination unit 30 determines that the start condition for the dimming control is satisfied when the position of the high-luminance target is located in a predetermined range at the center of the camera image and the size of the high-luminance target is a predetermined size or larger. The predetermined range and the predetermined size are not limited to any particular values, and may be previously set and stored in the ECU 1. The predetermined range and the predetermined size may be fixed values or variable values that vary in accordance with various inputs or conditions.

The dimming amount setting unit 40 sets a dimming amount for the dimming control. The dimming amount setting unit 40 may set a predetermined amount (50 percent) as the dimming amount. The dimming control unit 50 performs the dimming control based on the detection result of the high-luminance target detection unit 10. The dimming control unit 50 herein controls the headlamp HL such that the amount of light in one or more light distribution areas including the high-luminance target detected by the high-luminance target detection unit 10 becomes the dimming amount set by the dimming amount setting unit 40 as the dimming control.

The dimming control unit 50 does not perform the dimming control when the dimming control determination unit 30 determines that the brightness of the surrounding environment is the threshold or higher. In other words, the dimming control unit 50 performs the dimming control when the dimming control determination unit 30 determines that the brightness of the surrounding environment is not the threshold or higher. The dimming control unit 50 performs the dimming control when the dimming control determination unit 30 determines that the start condition for the dimming control is satisfied. In other words, the dimming control unit 50 does not perform the dimming control when the dimming control determination unit 30 determines that the start condition for the dimming control is not satisfied.

Next, an example of a vehicle headlight control method performed by the vehicle headlight control apparatus 100 of the present embodiment will be described with reference to the flowchart of FIG. 3. The following sequence of processes is repeated at predetermined intervals, for example, when the vehicle V is traveling and the headlamp HL is operating. The vehicle headlight control method is a method for controlling the headlamp HL and corresponds to the process of the vehicle headlight control program P (refer to FIG. 2).

Figure 3:
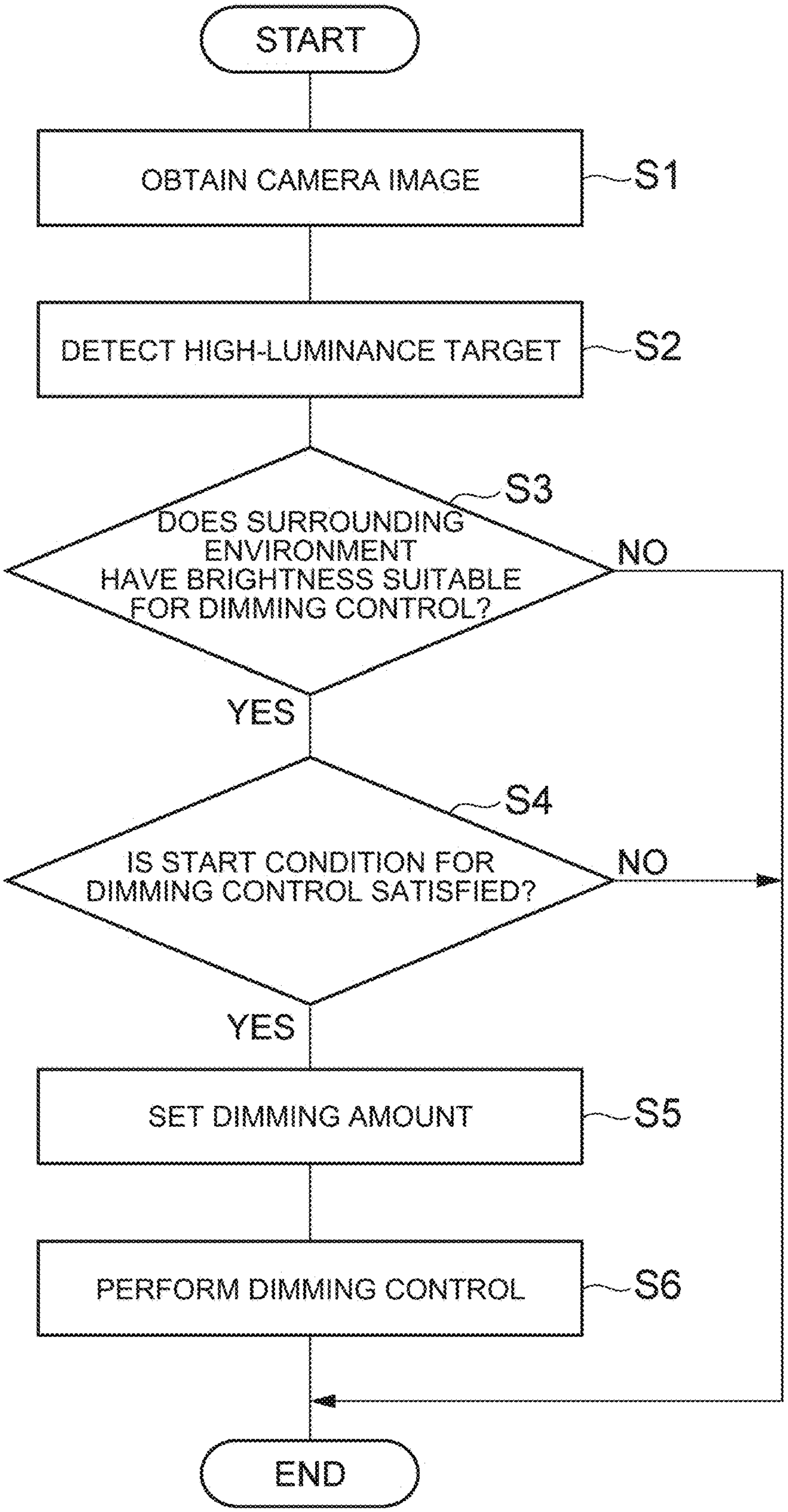
FIG. 3 is a flowchart showing an example of a vehicle headlight control method performed by the vehicle headlight control apparatus of FIG. 1.

As shown in FIG. 3, first, the ECU 1 obtains a camera image from the camera CA (step S1). The high-luminance target detection unit 10 detects a high-luminance target ahead of the vehicle V based on the camera image (step S2). The surrounding environment recognition unit 20 recognizes a surrounding environment of the vehicle V based on the camera image. The dimming control determination unit 30 determines whether the brightness of the surrounding environment of the vehicle V recognized by the surrounding environment recognition unit 20 is the threshold or higher (step S3).

In the case of YES in step S3, the dimming control determination unit 30 determines whether the start condition for the dimming control is satisfied (step S4). In the case of YES in step S4, the dimming amount setting unit 40 sets the dimming amount (step S5). Then, the dimming control unit 50 performs the dimming control (step S6). On the other hand, in the case of NO in step S3 or NO in step S4, the dimming control is not performed, and the process is finished.

Note that step S2 corresponds to the high-luminance target detection step. Steps S3, S4 correspond to the dimming control determination step. Step S6, which is not performed in the case of NO in step S3 or NO in step S4, corresponds to the dimming control step.

As described above, in the present embodiment, the dimming control is not performed in a situation in which the brightness of the surrounding environment of the vehicle V is sufficient, because the glare caused by the high-luminance target is unlikely to be felt. This makes it possible to reduce the annoyance felt by the occupant due to unnecessary dimming control. In addition, although the dimming control performed in the situation in which the surrounding environment of the vehicle V is bright may darken a sign or a billboard, making the details of the sign or billboard difficult to understand (causing visibility deterioration), such visibility deterioration can be reduced.

In the present embodiment, it is determined that the brightness of the surrounding environment is the threshold or higher when the brightness of the road surface around the vehicle V is the threshold or higher, the brightness of the sky around the vehicle V is the threshold or higher, or a plurality of streetlights is present around the vehicle V and the distance between the plurality of streetlights is the certain distance or less. In this case, the determination of whether the brightness of the surrounding environment is the threshold or higher can be specifically performed.

In the present embodiment, when the high-luminance target is located in the predetermined range at the center of the camera image and the size of the high-luminance target is the predetermined size or larger, it is determined that the start condition for the dimming control is satisfied, and the dimming control is performed. In this case, since the dimming control is not performed when the start condition is not satisfied, it is possible to further reduce the annoyance felt by the occupant due to unnecessary dimming control.

Although the embodiment has been described above, an aspect of the disclosure is not limited to the above embodiment. An aspect of the disclosure can be implemented in various modes with various changes and improvements based on the knowledge of those skilled in the art, in addition to the above embodiment.

Although the camera CA is adopted as the imaging device in the embodiment, this is not a limitation, and various known imaging devices may be adopted. Although the headlamp HL is adopted as the headlight in the embodiment, this is not a limitation, and various known headlights may be adopted.

What is claimed is:

1. A vehicle headlight control apparatus that controls a headlight capable of adjusting an amount of light for each of a plurality of light distribution areas, the apparatus comprising:

an electronic control unit (ECU) comprising a processor, the ECU being configured to execute:

a high-luminance target detection unit that detects a high-luminance target ahead of a vehicle based on an imaging result of an imaging device that captures an image of an area ahead of the vehicle;

a dimming control unit that performs dimming control to reduce the amount of light in the light distribution area including the high-luminance target based on a detection result of the high-luminance target detection unit; and a dimming control determination unit that determines whether a brightness of a surrounding environment is a threshold or higher based on the imaging result of the imaging device, wherein the dimming control unit does not perform the dimming control when the dimming control determination unit determines that the brightness of the surrounding environment is the threshold or higher.

2. The vehicle headlight control apparatus according to claim 1, wherein the dimming control determination unit determines that the brightness of the surrounding environment is the threshold or higher when a brightness of a road surface around the vehicle is a threshold or higher, a brightness of the sky around the vehicle is a threshold or higher, or a plurality of streetlights is present around the vehicle and a distance between the plurality of streetlights is a certain distance or less.

3. The vehicle headlight control apparatus according to claim 1, wherein the dimming control determination unit determines that a start condition for the dimming control is satisfied when the high-luminance target is located in a predetermined range at a center of an image that is the imaging result of the imaging device and a size of the high-luminance target is a predetermined size or larger, and the dimming control unit performs the dimming control when the dimming control determination unit determines that the start condition for the dimming control is satisfied.

4. The vehicle headlight control apparatus according to claim 1, wherein the ECU is configured to execute the high-luminance target detection unit, the dimming control unit, and the dimming control determination unit based on the vehicle being in a traveling state and the headlight being in an operating state.

5. The vehicle headlight control apparatus according to claim 4, wherein the high-luminance target is a target having a luminance higher than a predetermined luminance.

6. The vehicle headlight control apparatus according to claim 5, wherein the dimming control determination unit determines that a start condition for the dimming control is satisfied when the high-luminance target is detected, the high-luminance target is located in a predetermined range at a center of an image that is the imaging result of the imaging device, and a size of the high-luminance target is a predetermined size or larger, and the dimming control unit performs the dimming control when the dimming control determination unit determines that the start condition for the dimming control is satisfied.

7. The vehicle headlight control apparatus according to claim 6, wherein the dimming control unit performs the dimming control to reduce the amount of light only in the light distribution area including the high-luminance target, among the plurality of light distribution areas, based on the detection result of the high-luminance target detection unit.

8. A vehicle headlight control method for controlling a headlight capable of adjusting an amount of light for each of a plurality of light distribution areas, the method comprising:

a high-luminance target detection step of detecting a high-luminance target ahead of a vehicle based on an imaging result of an imaging device that captures an image of an area ahead of the vehicle;

a dimming control step of performing dimming control to reduce the amount of light in the light distribution area including the high-luminance target based on a detection result in the high-luminance target detection step; and a dimming control determination step of determining whether a brightness of a surrounding environment is a threshold or higher based on the imaging result of the imaging device, wherein the dimming control is not performed in the dimming control step when it is determined that the brightness of the surrounding environment is the threshold or higher in the dimming control determination step.

9. A vehicle headlight control program for controlling a headlight capable of adjusting an amount of light for each of a plurality of light distribution areas, the program causing a computer to execute:

a high-luminance target detection step of detecting a high-luminance target ahead of a vehicle based on an imaging result of an imaging device that captures an image of an area ahead of the vehicle;

a dimming control step of performing dimming control to reduce the amount of light in the light distribution area including the high-luminance target based on a detection result in the high-luminance target detection step; and a dimming control determination step of determining whether a brightness of a surrounding environment is a threshold or higher based on the imaging result of the imaging device, wherein the dimming control is not performed in the dimming control step when it is determined that the brightness of the surrounding environment is the threshold or higher in the dimming control determination step.

* * * * *